(No Model.)
F. A. WHITMORE.
CREEL FOR WARPING MACHINES.
No. 428,261. Patented May 20, 1890.
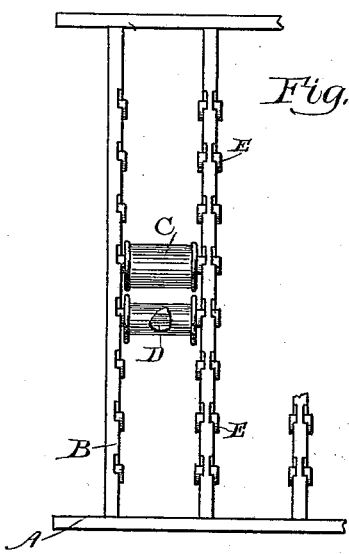
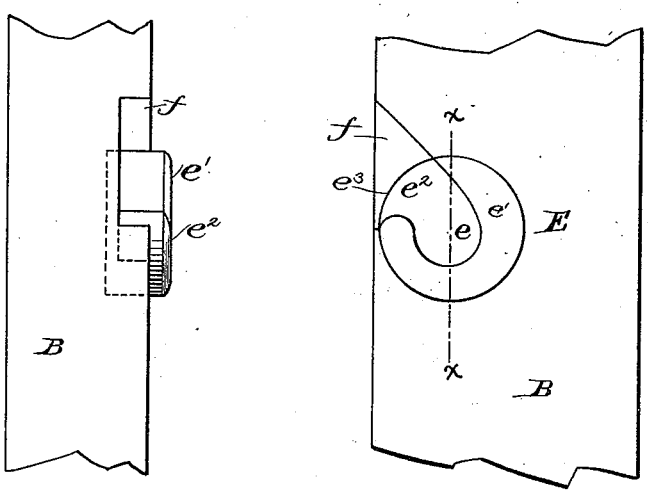
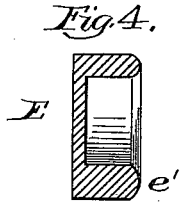
Witnesses
A. O. Owe
Frederick L. Emery.
Inventor
Fred A. Whitmore,
by Crosby & Gregory Attys.

UNITED STATES PATENT OFFICE.

FRED A. WHITMORE, OF HOPEDALE, MASSACHUSETTS, ASSIGNOR TO THE HOPEDALE MACHINE COMPANY, OF SAME PLACE.

CREEL FOR WARPING-MACHINES.

SPECIFICATION forming part of Letters Patent No. 428,261, dated May 20, 1890.

Application filed December 13, 1889. Serial No. 333,606. (No model.)

*To all whom it may concern:*

Be it known that I, FRED A. WHITMORE, of Hopedale, county of Worcester, and State of Massachusetts, have invented an Improvement in Creels for Warping-Machines, of which the following description, in connection with the accompanying drawings, is a specification, like letters on the drawings representing like parts.

This invention has for its object to improve creels for warping-machines, especially as to the bearings for the skewers used to support the spools from which the yarn is being unwound. Skewers are commonly sustained at their ends in suitable bearings, which need lubrication and which wear rapidly. In accordance with my invention I have provided a vitreous bearing having an open or slotted eye for the reception of the skewer, the said bearing having one end closed to receive against it the end of the skewer, the bearing being shown as cylindrical and set into a circular hole in the creel-upright at the end of a diagonal slot cut therein.

Figure 1 in elevation shows part of a creel for warping-machines with my improved bearings added; Fig. 2, an enlarged edge view of part of one of the uprights with one of my bearings added; Fig. 3, a right-hand side view of the parts shown in Fig. 2; and Fig. 4, a section of one of my improved bearings in the line $x$, Fig. 3.

The base A, the uprights B, spools C, and their skewers D are and may be all as common in creels for warping-machines.

The bearings E are cylindrical externally, and they have a central opening $e$, extended nearly through the same from one to the other end, the opening being surrounded by a wall or curb $e'$, having a mouth or opening at $e^2$ to permit the end of a skewer to be put into it laterally, in order to be supported therein. To apply these bearings, the uprights of the creel-frame have circular cavities bored into them a short distance back from one edge, and each upright is then provided with a shallow groove or passage $f$, cut through from its edge to intersect the circular cavity, but preferably of less depth, so that a bearing may be crowded into a circular cavity and be turned so that its open mouth will intersect the said groove $f$, as best shown in Figs. 2 and 3, the cylindrical end of the bearing abutting against the upright and preventing the contact of the end of the skewer with the uprights. A bearing such as described does not need to be lubricated, is strong and durable, and when applied as described will remain in place without any fastening devices.

I do not broadly claim a vitreous bearing, as I am aware that vitreous bearings have been secured to the outer edges of the uprights of warp-creels, such bearings being, however, secured to the outsides of the uprights, where they are exposed to blows, and are frequently chipped or broken off and destroyed, and when chipped or broken off the operators are liable to cut their hands upon the same. In this my invention the bearings are set into recesses made in the uprights of the creel-frame back from their edges, and are thus protected from injury by blows, and prior to my invention I am not aware that a vitreous bearing has been made with an open mouth and closed end, as described, and set within the uprights of a creel.

I claim—

The combination, with the uprights of a creel, the said uprights having recesses and grooves $f$, of the vitreous bearings having open mouths and closed at one end, substantially as described.

In testimony whereof I have signed my name to this specification in the presence of two subscribing witnesses.

FRED A. WHITMORE.

Witnesses:
E. D. BANCROFT,
H. F. SEARLES.